US008121263B2

(12) United States Patent
Yao et al.

(10) Patent No.: US 8,121,263 B2
(45) Date of Patent: Feb. 21, 2012

(54) METHOD AND SYSTEM FOR INTEGRATING VOICEMAIL AND ELECTRONIC MESSAGING

(75) Inventors: Rose Yao, San Francisco, CA (US); Ariel L. Rideout, Sunnyvale, CA (US); Michael D. Sego, Arcadia, CA (US)

(73) Assignee: Google Inc., Mountain View, CA (US)

( * ) Notice: Subject to any disclaimer, the term of this patent is extended or adjusted under 35 U.S.C. 154(b) by 472 days.

(21) Appl. No.: 11/459,295

(22) Filed: Jul. 21, 2006

(65) Prior Publication Data

US 2008/0037726 A1    Feb. 14, 2008

(51) Int. Cl.
*H04M 11/00*    (2006.01)

(52) U.S. Cl. ............. 379/88.13; 370/352; 370/353; 370/354; 370/355; 370/356; 379/88.11; 379/88.14; 379/88.17; 379/88.18; 379/88.22; 455/413; 455/414.1; 709/201; 709/206; 709/227; 709/230; 715/203; 715/210; 715/243; 715/277; 715/752

(58) Field of Classification Search .... 379/88.11–88.14, 379/88.17–88.18, 88.22–88.23, 67.1–88.28; 455/412.1–417; 715/201, 203, 716, 727–729, 715/752, 754–766, 780, 809, 866, 209, 210, 715/243–253, 277, 751; 370/351–356; 348/14.01–14.16; 709/201–207, 217–244
See application file for complete search history.

(56) References Cited

U.S. PATENT DOCUMENTS

| | | | |
|---|---|---|---|
| 5,568,540 A * | 10/1996 | Greco et al. | 379/88.25 |
| 6,169,911 B1 * | 1/2001 | Wagner et al. | 455/566 |
| 6,330,589 B1 | 12/2001 | Kennedy | 709/206 |
| 6,430,170 B1 | 8/2002 | Saints et al. | 370/335 |
| 6,430,174 B1 | 8/2002 | Jennings et al. | 370/352 |
| 6,484,196 B1 | 11/2002 | Maurille | 709/206 |
| 6,525,747 B1 | 2/2003 | Bezos | 345/751 |
| 6,563,912 B1 * | 5/2003 | Dorfman et al. | 379/88.13 |
| 6,624,826 B1 * | 9/2003 | Balabanovic | 715/727 |
| 6,630,944 B1 | 10/2003 | Kakuta et al. | 345/758 |
| 6,707,580 B1 | 3/2004 | Bloomfield | 358/402 |
| 6,728,934 B1 | 4/2004 | Scopes | 715/513 |
| 6,769,012 B1 * | 7/2004 | Liu et al. | 709/204 |
| 6,784,901 B1 * | 8/2004 | Harvey et al. | 715/757 |
| 6,839,411 B1 * | 1/2005 | Saltanov et al. | 379/88.13 |
| 6,917,965 B2 * | 7/2005 | Gupta et al. | 709/206 |

(Continued)

OTHER PUBLICATIONS

USA Today, "Report: Google ready to walk the walk with text, voice Ims," Copyright 2005 Reuters Limited, 2 pages, http://www.usatoday.com/tech/news/2005-08-23-google-im_x.htm.

(Continued)

*Primary Examiner* — Hemant Patel
(74) *Attorney, Agent, or Firm* — Morgan, Lewis & Bockius LLP

(57) ABSTRACT

When an electronic message with a voicemail attachment is received, an audio player object and a reply by chat object are displayed simultaneously along with the electronic message. A reply to the electronic message, whether by chat or by email, is associated with the same thread as the electronic message. The electronic message with the voicemail attachment is associated with a conversation thread that may also include chat messages and email messages. In a conversation view of a respective conversation thread, representations of an electronic voicemail message (an electronic message having a voicemail attachment), one or more chat messages and one or more email messages may be displayed simultaneously.

34 Claims, 15 Drawing Sheets

U.S. PATENT DOCUMENTS

| | | | |
|---|---|---|---|
| 6,968,362 B2 | 11/2005 | Koch et al. | 709/206 |
| 6,999,565 B1 * | 2/2006 | Delaney et al. | 379/88.13 |
| 7,003,724 B2 | 2/2006 | Newman | 715/526 |
| 7,007,226 B1 | 2/2006 | Smith et al. | 715/500 |
| 7,065,187 B2 * | 6/2006 | Myers et al. | 379/88.22 |
| 7,107,544 B1 * | 9/2006 | Luke | 715/752 |
| 7,110,510 B1 | 9/2006 | Shaffer et al. | 379/88.25 |
| 7,117,445 B2 * | 10/2006 | Berger | 715/752 |
| 7,194,516 B2 | 3/2007 | Giacobbe et al. | 709/206 |
| 7,222,156 B2 * | 5/2007 | Gupta et al. | 709/206 |
| 7,239,629 B1 | 7/2007 | Olshansky et al. | 370/353 |
| 7,305,438 B2 * | 12/2007 | Christensen et al. | 709/205 |
| 7,328,242 B1 | 2/2008 | McCarthy et al. | 709/204 |
| 7,359,493 B1 * | 4/2008 | Wang et al. | 379/88.23 |
| 7,421,690 B2 | 9/2008 | Forstall et al. | 718/100 |
| 7,472,351 B1 * | 12/2008 | Zilka | 715/748 |
| 7,487,441 B2 * | 2/2009 | Szeto | 715/234 |
| 7,519,912 B2 | 4/2009 | Moody et al. | 715/753 |
| 7,574,349 B2 * | 8/2009 | Perronnin | 704/9 |
| 2001/0033296 A1 | 10/2001 | Fullerton et al. | 345/730 |
| 2002/0034281 A1 * | 3/2002 | Isaacs et al. | 379/88.12 |
| 2002/0070984 A1 | 6/2002 | Newman | 345/853 |
| 2002/0073117 A1 | 6/2002 | Newman | 707/513 |
| 2002/0111991 A1 * | 8/2002 | Wood et al. | 709/203 |
| 2002/0161775 A1 * | 10/2002 | Lasensky et al. | 707/100 |
| 2003/0026402 A1 * | 2/2003 | Clapper | 379/142.01 |
| 2003/0208543 A1 * | 11/2003 | Enete et al. | 709/206 |
| 2003/0212746 A1 | 11/2003 | Fitzpatrick et al. | 709/206 |
| 2004/0054735 A1 | 3/2004 | Daniell et al. | 709/206 |
| 2004/0054737 A1 * | 3/2004 | Daniell | 709/206 |
| 2004/0073616 A1 | 4/2004 | Fellenstein et al. | 709/206 |
| 2004/0119740 A1 | 6/2004 | Chang et al. | 345/751 |
| 2004/0136510 A1 * | 7/2004 | Vander Veen | 379/88.22 |
| 2004/0141594 A1 * | 7/2004 | Brunson et al. | 379/88.12 |
| 2004/0158611 A1 * | 8/2004 | Daniell et al. | 709/206 |
| 2004/0255308 A1 | 12/2004 | Leban et al. | 719/328 |
| 2005/0004990 A1 | 1/2005 | Durazo et al. | 709/206 |
| 2005/0076110 A1 | 4/2005 | Mathew et al. | 709/223 |
| 2005/0114781 A1 * | 5/2005 | Brownholtz et al. | 715/733 |
| 2005/0149500 A1 | 7/2005 | Marmaros et al. | 707/3 |
| 2005/0210394 A1 * | 9/2005 | Crandall et al. | 715/752 |
| 2005/0243979 A1 * | 11/2005 | Starbuck et al. | 379/88.19 |
| 2005/0262547 A1 * | 11/2005 | Langlais | 725/135 |
| 2006/0080592 A1 * | 4/2006 | Alves de Moura et al. | 715/501.1 |
| 2006/0090137 A1 * | 4/2006 | Cheng et al. | 715/758 |
| 2006/0123347 A1 * | 6/2006 | Hewitt et al. | 715/748 |
| 2006/0161849 A1 | 7/2006 | Miller et al. | 715/744 |
| 2006/0179114 A1 * | 8/2006 | Deeds | 709/206 |
| 2006/0235883 A1 | 10/2006 | Krebs | 707/104 |
| 2006/0253787 A1 * | 11/2006 | Fogg | 715/752 |
| 2007/0041522 A1 * | 2/2007 | Abella et al. | 379/88.14 |
| 2007/0047697 A1 | 3/2007 | Drewry et al. | 379/88.13 |
| 2007/0061738 A1 | 3/2007 | Taboada et al. | 715/752 |
| 2007/0116195 A1 * | 5/2007 | Thompson et al. | 379/67.1 |
| 2008/0005691 A1 * | 1/2008 | Malik et al. | 715/765 |

OTHER PUBLICATIONS

International Search Report and Written Opinion dated Aug. 25, 2008, for related corresponding U.S. Appl. No. 11/459,303.

Office Action dated Jul. 28, 2008, for related U.S. Appl. No. 11/459,303.

Office Action dated Dec. 15, 2008, for related U.S. Appl. No. 11/459,303.

Final Office Action dated May 18, 2009, for related U.S. Appl. No. 11/459,303.

* cited by examiner

METHOD AND SYSTEM FOR INTEGRATING VOICEMAIL AND ELECTRONIC MESSAGING

RELATED APPLICATIONS

This application is related to U.S. patent application Ser. No. 11/459,303, "Method and System for Generating and Presenting Conversation Threads Having Email, Voicemail and Chat Messages," filed Jul. 21, 2006.

TECHNICAL FIELD

The disclosed embodiments relate generally to electronic messaging, and more particularly, to methods and systems for integrating voicemail and electronic messaging.

BACKGROUND

In today's digital age, users can communicate with each other in a wide variety of ways. For example, email and voice over the wired or wireless telephone networks have become ubiquitous in our society. Voice over Internet Protocol (VoIP) has also become a popular form of communication. However, these forms of communications are still considered distinct. As a result, users have to use different applications for different forms of communication.

The present invention provides systems and methods for integrating different forms of electronic communication, such as email and voice communications, or email, voicemail and chat (sometimes called instant messaging) communications.

BRIEF DESCRIPTION OF THE DRAWINGS

Like reference numerals refer to corresponding parts throughout the drawings.

DESCRIPTION OF EMBODIMENTS

Figure 1:
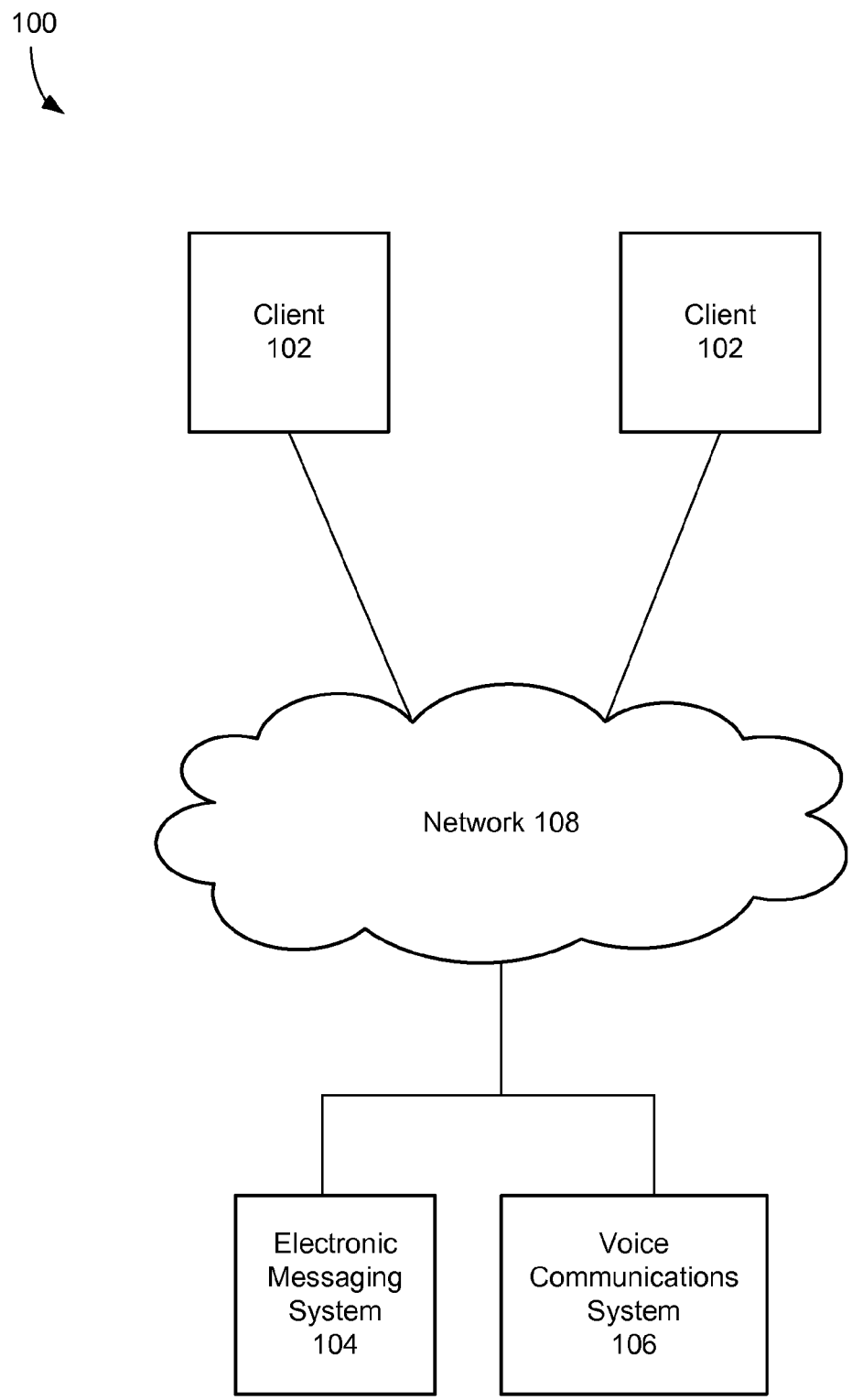
FIG. 1 is a block diagram illustrating a computer network in accordance with some embodiments.

FIG. 1 is a block diagram illustrating a computer network in accordance with some embodiments. The computer network 100 includes one or more clients 102, an electronic messaging system 104, a voice communications system 106, and a network 108 for interconnecting these components. The network 106 may include one or more of the following: local area networks (LAN), wide area networks (WAN), intranets, wireless networks, and the Internet.

The one or more clients 102 are devices (sometimes called client devices) from which a user may communicate with other users via the electronic messaging system 104 and the voice communications system 106. The client 102 may be any device capable of receiving data from and sending data to other computers, devices, and so forth through the network 106. Examples of client devices may include, without limitation, desktop computers, notebook (or laptop) computers, personal digital assistants (PDAs), mobile phones, network terminals, and so forth. In some embodiments, the client device includes one or more applications for communicating with other computers or devices through the network 106. Examples of such applications include, without limitation, web browsers, email applications, instant messaging or chat applications, and voice over Internet Protocol (VoIP) applications.

The electronic messaging system 104 provides electronic messaging services. The electronic messaging system 104 may include one or more electronic messaging servers 700, further details of which are described below in FIG. 7. In some embodiments, the electronic messages handled by the electronic messaging system 104 include email messages (sometimes called emails) and chat messages (also sometimes called instant messaging messages or IM messages). The electronic messaging system 104 receives electronic messages from other computers, such as clients 102, stores the messages, organizes the messages into conversation threads, and delivers them to other computers. The electronic messaging system 104 may also receive and deliver attachments to the electronic messages and provide objects (e.g., client executable objects) for opening the attachments. In some embodiments, the attachments may include images, digital audio data or files, digital video data or files, and other documents such as text files, Portable Document Format (PDF) files, and documents composed in word processor software.

In some embodiments, the electronic messaging system 104 includes a web-based interface. The web-based interface includes webpages that are sent to and rendered by a web browser application on a client 102 when requested by a user. Through the web-based interface, a user can interact with the electronic messaging system 104 and utilize its services, such as sending, receiving, and viewing electronic messages. Email systems that utilize a web-based interface are sometimes called webmail or web-based email. The web-based interface may be implemented using well-known technologies such as Hypertext Markup Language (HTML), JavaScript, Cascading Style Sheets (CSS), and so forth.

The voice communications system 106 provides voice communications services. The voice communications system 106 may include one or more voice communications servers 600, further details of which are described below in FIG. 6. The voice communications system 106 receives voice data (or more generally, audio data) from other computers and converts the audio data into digital audio data. In some embodiments, the voice communications system 106 encodes and compresses the voice data into a digital audio file (sometimes called a digital audio data file or audio data file) using the MP3 encoding standard. In some other embodiments, other encoding and compression standards or audio file formats, whether lossy or lossless, may be used. Examples include waveform audio (.wav), Advanced Audio Coding (.aac), and Windows Media Audio (.wma) formats. The voice communications system 106 may also send the digital audio to other computers or systems. In some embodiments, the voice communications system 106 sends the digital audio to other computers or systems, such as the electronic messaging system 104, as attachments to electronic messages.

The voice communications system 106 may receive audio data from one or more client applications on the client 102. Examples of client applications that can send audio data to the voice communications system 106 include voice over Internet Protocol (VoIP) applications, voice chat applications, or instant messaging applications with voice communications modules.

In some embodiments, the voice communications system 106 may be a part of a communications system that includes presence information, i.e. information regarding whether a person is online, offline, busy, etc. If a person is online, a user may communicate with the person in real time or near-real time, akin to a phone call. If a person is offline, busy, or otherwise not responding, a user may leave a voicemail message, as a digital audio file, for the person.

It should be appreciated that while the embodiments disclosed in this specification are described in the context of voice communications, voicemails, and audio data files that represent voicemails, the embodiments may be adapted for use with audio data generally. That is, the embodiments may be adapted for use with audio data that does not include voice data, or audio data that includes both voice data and other sounds. The term "voicemail message" is used in this document to mean audio data, which may be stored, for example, in an audio data file, that contains a voicemail. The term "electronic voicemail message" is used in this document to mean an electronic message that contains or is associated with audio data that contains a voicemail message.

Figure 2:
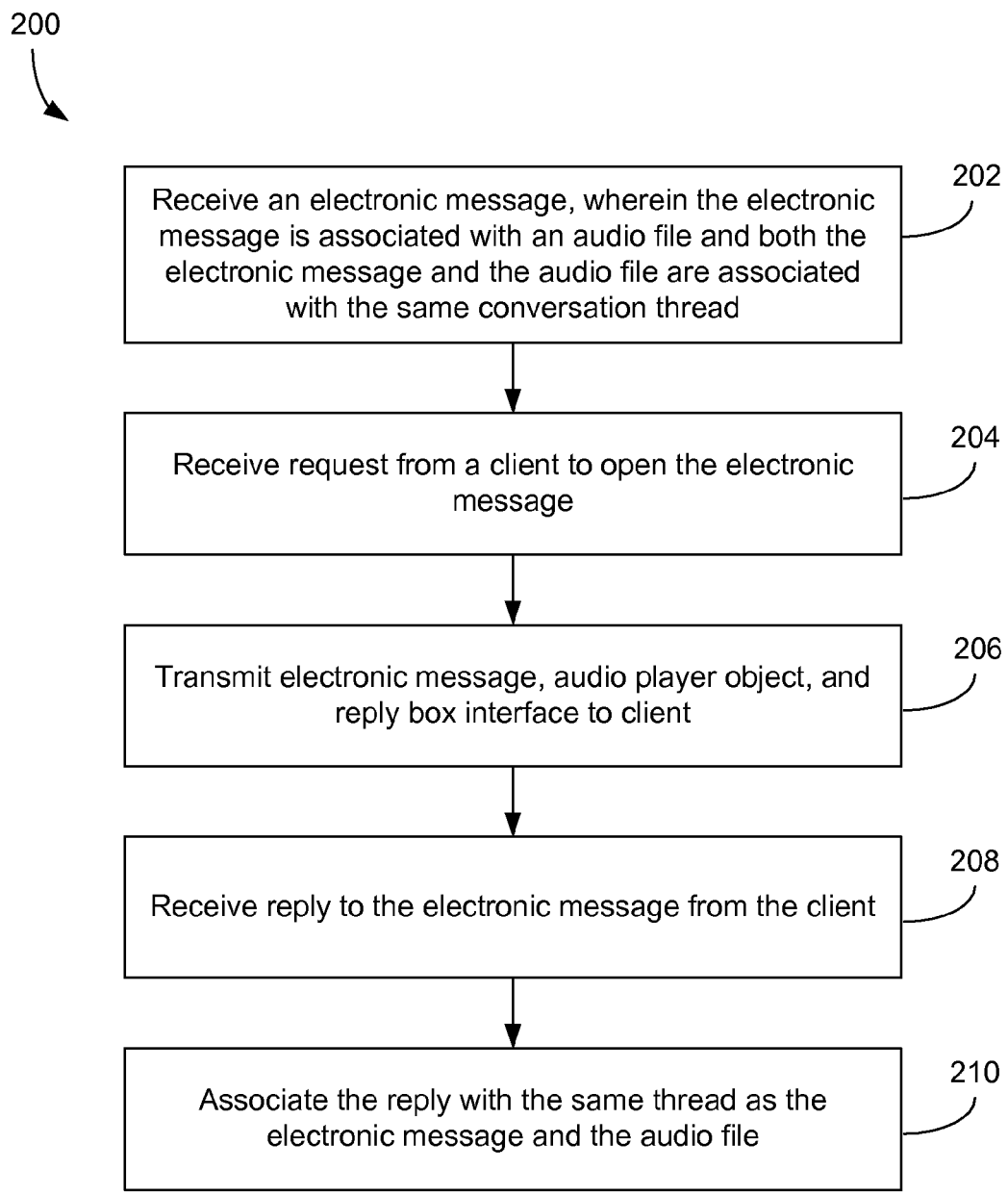
FIG. 2 is a flow diagram illustrating a process for associating an electronic message that has associated audio data and a reply to the electronic message with the same thread in accordance with some embodiments.

Attention is now directed to FIG. 2, which is a flow diagram illustrating a process for 200 for associating both an electronic message that has an associated digital audio file and a reply to the electronic message with the same thread in accordance with some embodiments. An electronic message is received, wherein the electronic message is associated with audio data (e.g., an audio data file), which may be a voicemail, and both the electronic message and the audio data are associated with the same conversation thread (202). For example, the audio data file may be an attachment to the electronic message, and the conversation thread to which the electronic message is assigned is also the conversation thread associated with the attached audio data file. In some embodiments, each distinct conversation thread has a distinct conversation ID or identifier. All the messages assigned to or associated with a conversation thread are assigned or associated with the same conversation ID.

A request from a client to open the electronic message is received (204). The electronic message, an audio player object, and a chat reply object are transmitted to the client (206). A reply to the electronic message is received from the client (208). The received reply is associated with the same conversation thread as the electronic message and the audio data file (210).

Figure 3:
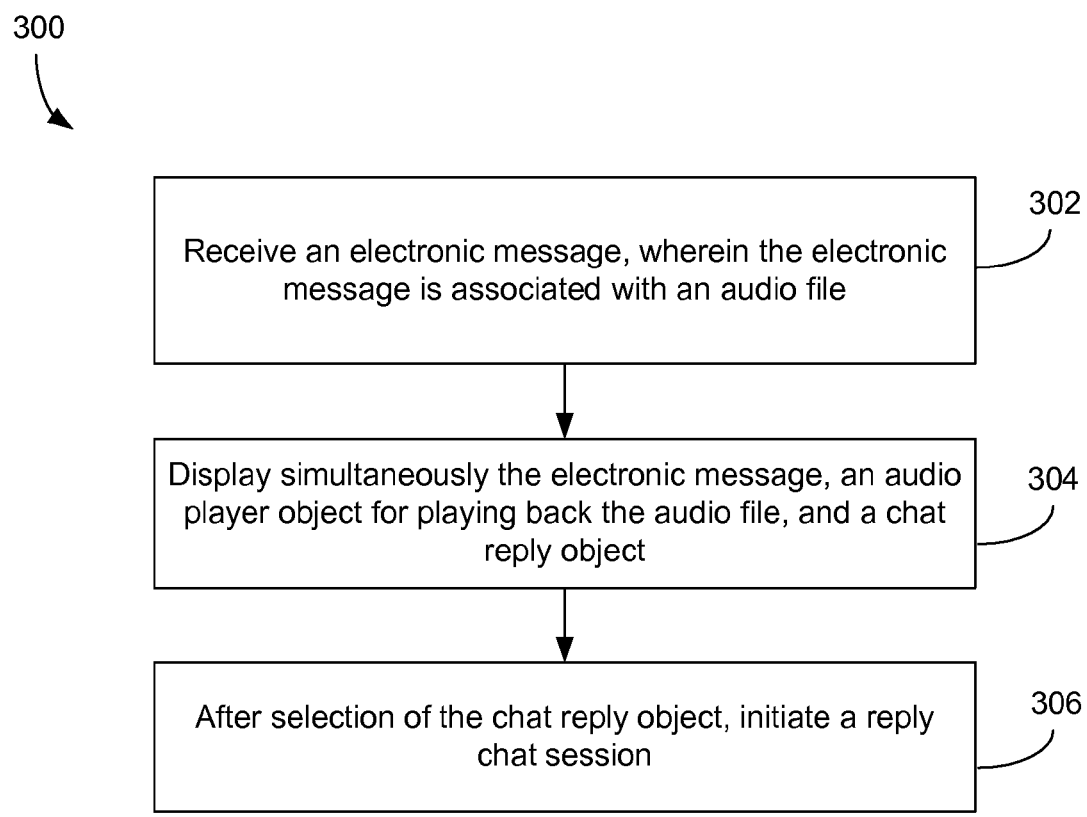
FIG. 3 is a flow diagram illustrating a process for displaying an audio player and a chat reply object with an electronic message in accordance with some embodiments.

Attention is now directed to FIG. 3, which is a flow diagram illustrating a process flow 300 for displaying an audio player and a chat reply object with an electronic message in accordance with some embodiments. An electronic message is received at a client, wherein the electronic message is associated with a digital audio file (302). The electronic message is displayed simultaneously with an audio player object for playing the digital audio file and a chat reply object (304).

While the items described above are displayed, a user of the client may select the chat reply object. After user selection of the chat reply object, a reply chat session is initiated (306). In some embodiments, the session is initiated by opening a new chat window. The chat session is configured to be a reply to the electronic message and the audio file.

Attention is now directed to FIGS. 4A-4G, which illustrate exemplary graphical user interfaces for displaying an audio player object and a chat reply object with an electronic message in accordance with some embodiments. FIGS. 4A-4G illustrates graphical user interfaces of a webmail application rendered in a web browser. The webmail application interface 400 may include a search box 402 for searching emails (or, alternately, for searching all electronic messages in a user's account) and a listing of folders or other organizational units 403, such as an inbox, trash, spam, sent messages, and so forth. In some embodiments, the interface 400 also includes a list of chat contacts 405. The list of chat contacts 405 shows the presence information for the contacts in the list.

Figure 4A:
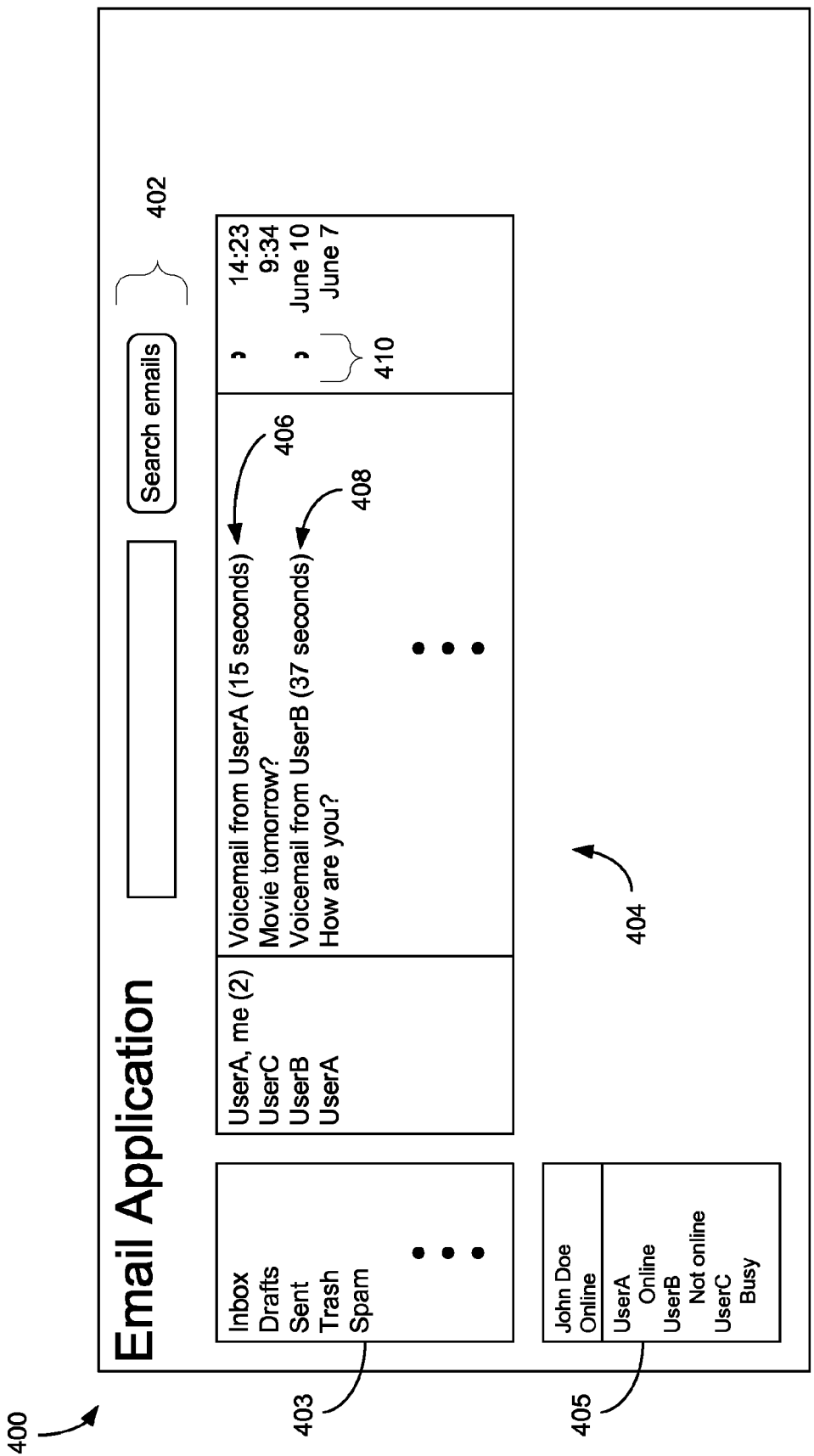
FIGS. 4A-4G illustrates an exemplary graphical user interface for displaying an audio player and a chat reply object with an electronic message in accordance with some embodiments.

The interface 400 includes a list of conversation threads 404 (also variously called "threads" and "conversations"). The list of conversation threads 404 includes a list of conversations in the folder or other organizational unit that the user has selected. Each item in the list 404 is a compressed representation of a respective conversation thread. For example, if the user has selected the inbox from the folder list 403, the list of threads 404 lists the conversations in the inbox. Some of the conversation threads in the list of threads may include electronic messages that have voicemail attachments. In some cases, these threads 406 and 408 may include a subject name that indicates the conversation thread includes a voicemail, the sender of the voicemail, and a length of the voicemail. Additionally, as shown in FIG. 4A, a phone icon 410 may be shown in the compressed representation of a respective thread 406 or 408 to indicate that the thread includes a voicemail attachment.

Figure 4B:
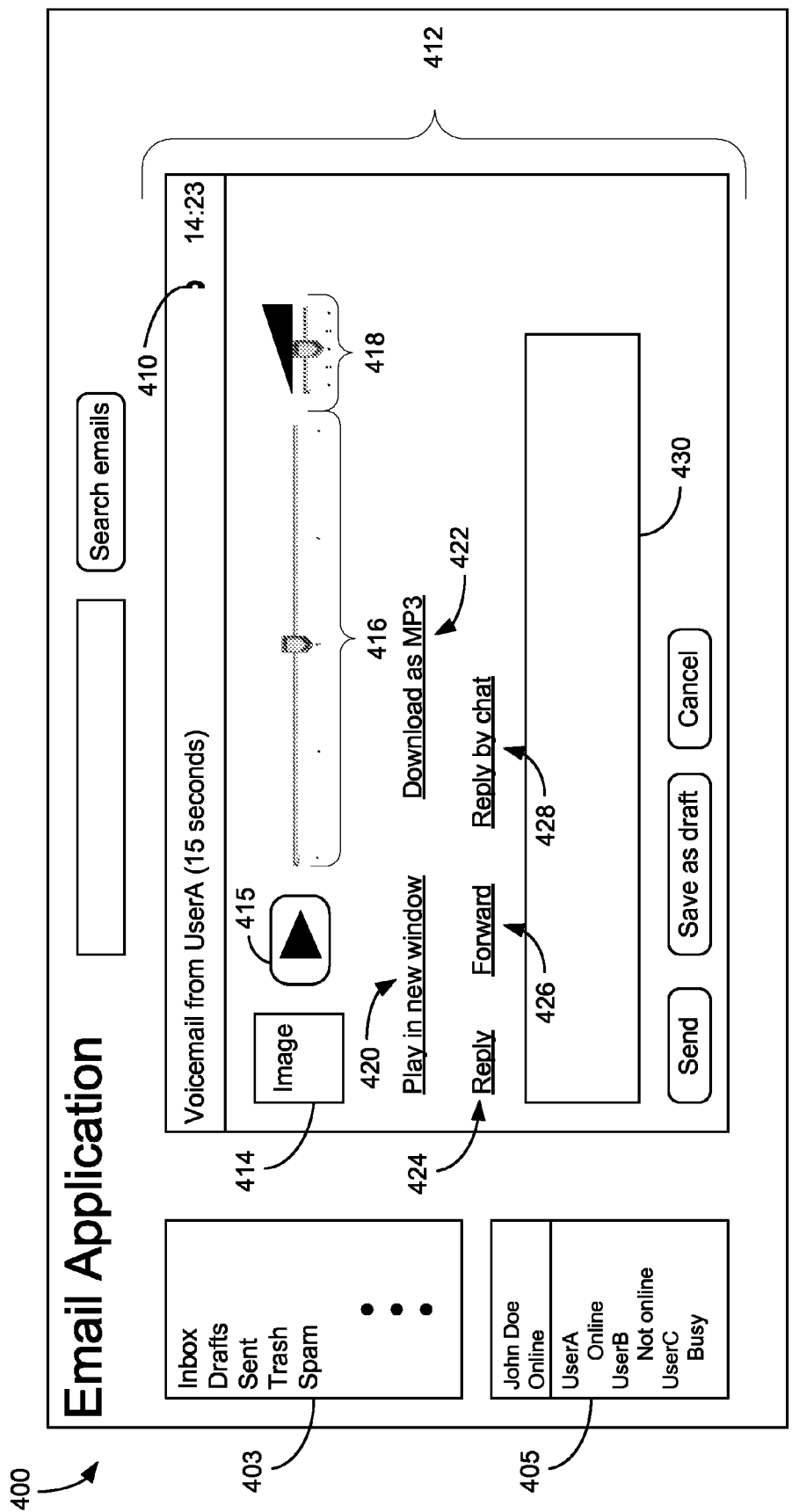
Figure 4C:
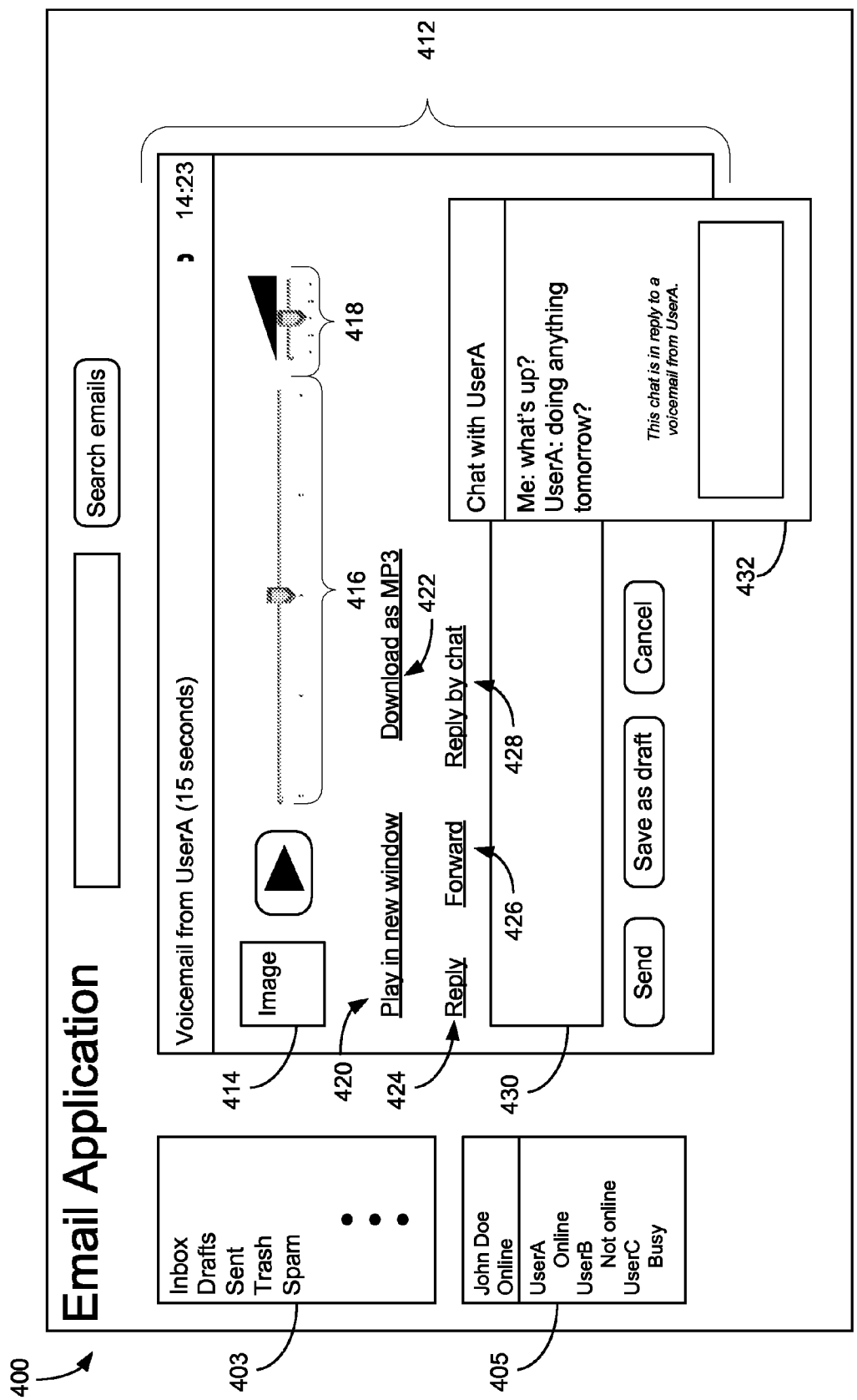

When the user selects a thread, the interface 400 displays the thread view 412 (also sometimes called the conversation view) for the user selected thread, as shown in FIG. 4B. In some embodiments, when the thread includes a voicemail attachment, the thread view 412 includes an audio player object, which includes a playback/pause object, a playback progress object and a volume control object. In the embodiment shown in FIG. 4B, the thread view 412 includes a playback/pause button 415, a progress slider 416 and a volume slider 418. The thread view 412 may also include an image associated with the sender of the voicemail, if one is available. If an image associated with the sender is not available, a generic silhouette of a person may be displayed instead. In some embodiments, the thread view 412 includes a link 420 (or more generally an object) to open the audio player object in a new window and a link 422 (or more generally an object) to download the voicemail attachment may also be included.

Figure 4D:
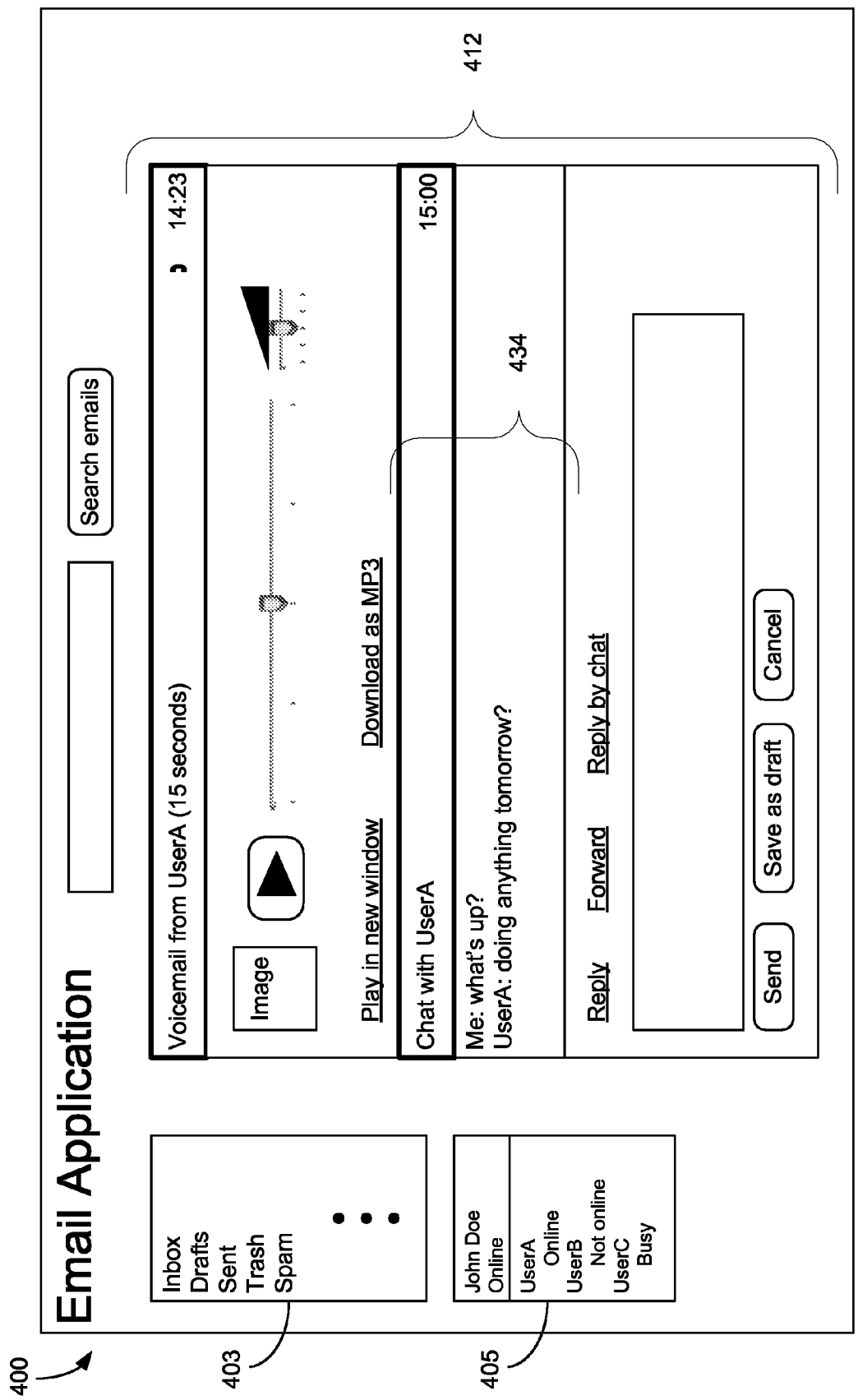

The thread view 412 may also include one or more reply objects. In some embodiments, the reply objects may include any combination of the following: a link 424 to start a reply message, a link 426 to start a message forwarding message, a link 428 (a chat link or chat reply object) to open a window for a chat session with the sender, and a reply box 430 for composing or entering a reply message. If the user selects the chat link 428, a chat window 432 opens. See FIG. 4C. Via the chat window, the user and the sender can engage in a chat session, sometimes called an instant messaging session. In some embodiments, when that chat session is ended, a transcript of the chat session is saved (as one or more electronic messages) and associated with the same conversation thread as the voicemail. As shown in FIG. 4D, when the user views the thread later, the thread view 412 includes the transcript 434 of the chat session.

Figure 4E:
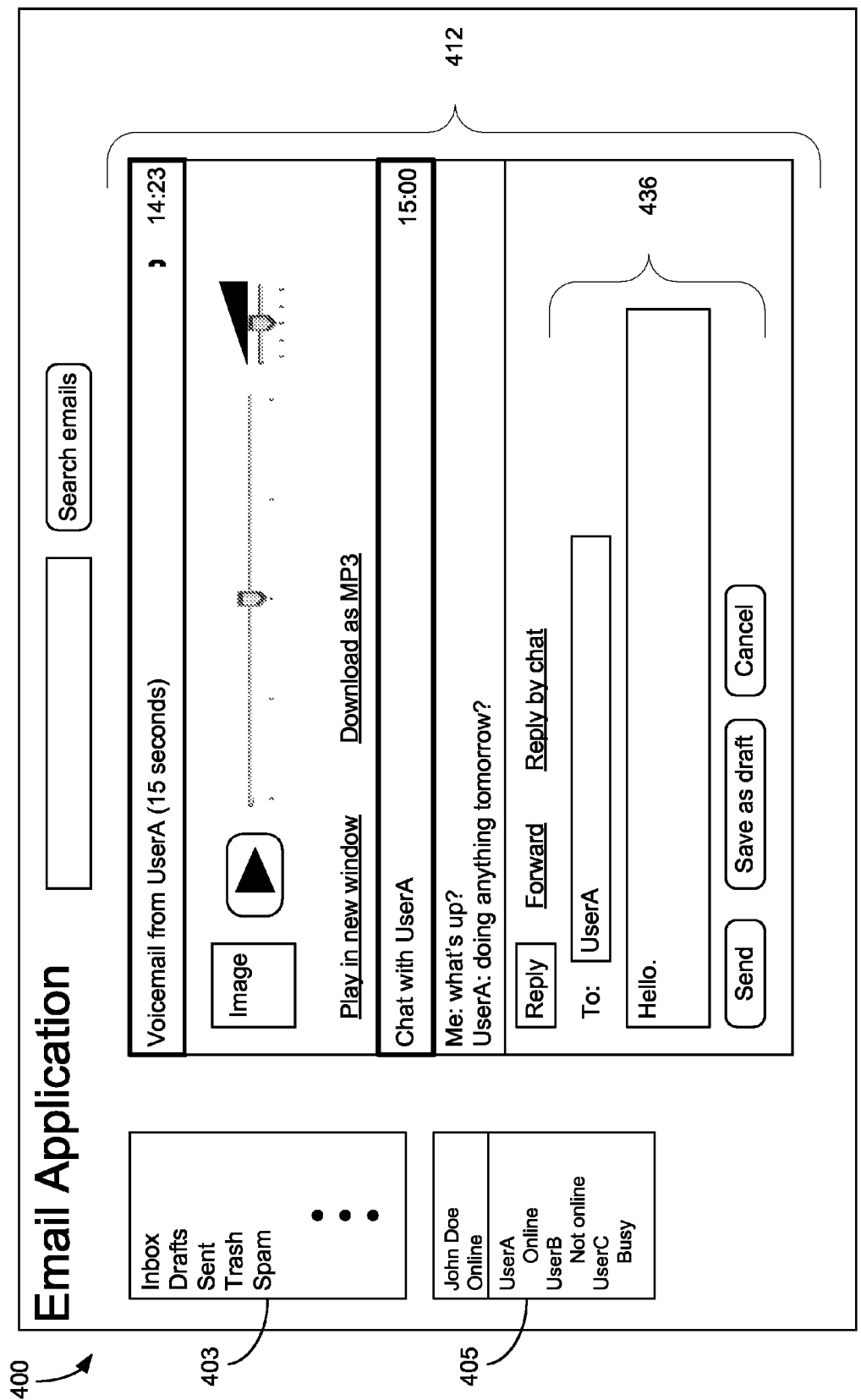
Figure 4F:
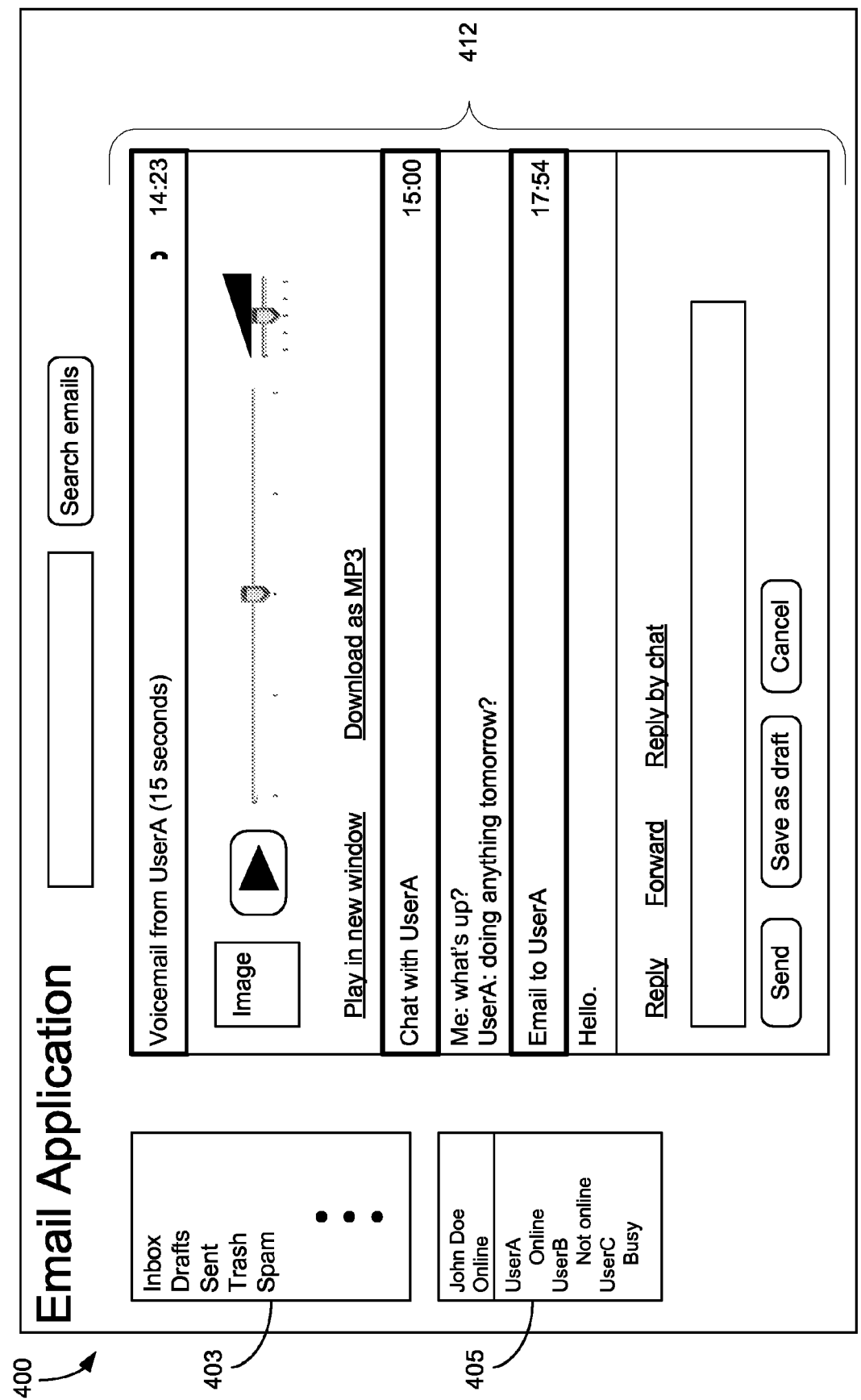

Referring now to FIG. 4B and FIG. 4E, if the user selects the reply link 424 (FIG. 4B), a reply interface 436 (FIG. 4E) may be shown on the client device. In the reply interface 436, the user can edit the list of recipients for the reply message and enter (e.g., compose and/or edit) a reply message. When the user sends the reply message, the reply message is saved and associated with the same conversation thread as the electronic voicemail message and the initial message. As shown in FIG. 4F, when the same conversation thread is selected for viewing later, the thread view 412 displays the reply along with other messages in the thread, including the message with the voicemail attachment.

Figure 4G:
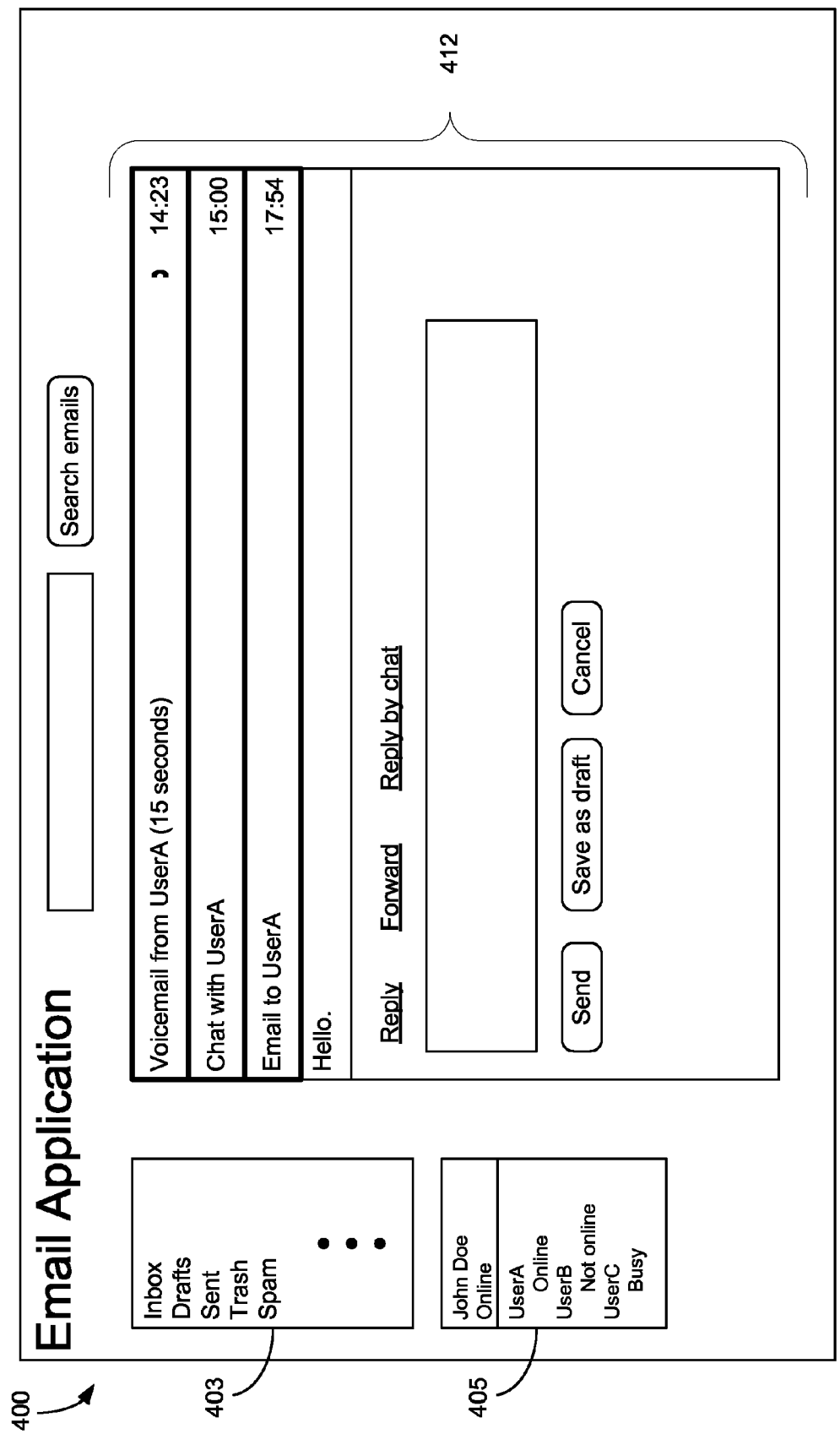

In some embodiments, the thread view 412 may display the body of only the most recent message in the thread, as shown in FIG. 4G; while displaying a compressed representation of the other messages in the thread. The compressed representation of a message in the thread may include information such as subject and date/time, and may optionally also indicate the sender of the message. The compressed representation of a respective electronic voicemail message (see FIG. 4G) includes the voicemail icon 410 (FIG. 4B). User selection of the compressed presentation of a respective message in the conversation thread, for example by clicking on the compressed presentation, causes the user device to redisplay the conversation thread with the user selected message being displayed in an expanded (e.g., full text) representation. When the user selected message (i.e., a user selected compressed representation of a message) is an electronic voicemail message, the expanded representation of the electronic voicemail message includes the audio player object, as shown in FIGS. 4D, 4E and 4F. If the user selects the forward link 426 (FIG. 4B), a forwarding interface that resembles the reply interface 436 may be shown. In the forwarding interface, the user can edit the list of recipients for the forward message and edit the forward message.

Figure 5A:
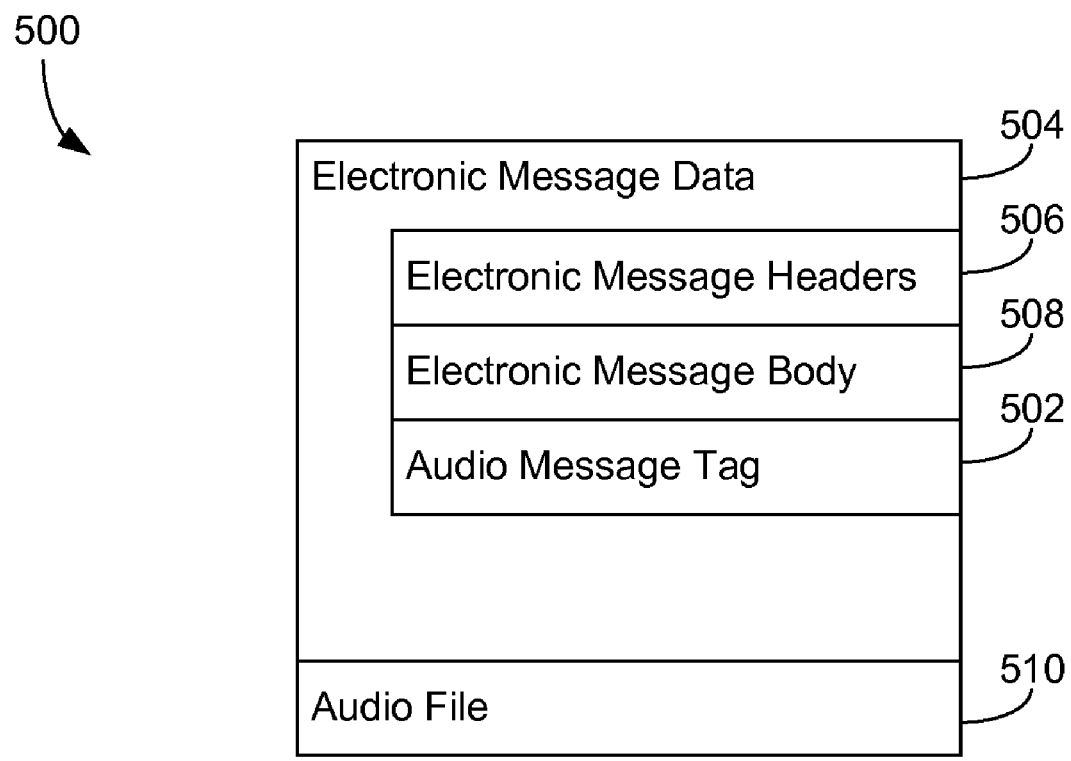
FIG. 5A is a diagram illustrating an exemplary data structure for an electronic message having an associated digital audio file in accordance with some embodiments.

As described above, a voicemail may be delivered as an attachment to an electronic message such as an email. In some embodiments, the electronic message to which the voicemail is attached, as generated by a voice communications system 106, may include a special tag or identifier tagging the electronic message as one with a voicemail attachment. Directing attention now to FIG. 5, the electronic voicemail message data structure 500 may include an voicemail tag or identifier 502 that identifies the message as having a voicemail attachment (i.e., an audio data attachment that contains a voicemail message). The voicemail tag 502 is included in the electronic message data 504, which also includes the headers 506 and the body 508 of the electronic message. The data structure 500 also includes the attachment audio file 506. The voicemail tag 502 is one of several types of metadata that may be included in or otherwise associated with an electronic message. Labels, including labels automatically assigned by the electronic messaging system (e.g., "Inbox") and/or user assigned labels (e.g., "vacation", or "work"), are another type of metadata that may be included in or otherwise associated with an electronic message.

The tag 502 tags the particular electronic message to which the tag is added as one that includes a voicemail attachment. Such electronic messages are sometimes herein called electronic voicemail messages. When an electronic messaging system 104 receives an electronic message with the tag 502 (i.e., an electronic voicemail message), the electronic messaging system 104 may treat the message specially. In some embodiments, the special treatment includes indexing the message such that it is searchable as a voicemail or audio message. In some embodiments, another special operation performed for messages with a voicemail tag 502 is sending an audio player object along with the message when the message is delivered to a client for display or opening. In some embodiments, if the same electronic message and voicemail attachment is included later in a reply or forwarding message, the voicemail tag 502 is not included in the reply or forwarding message, because the original recipient of the electronic voicemail message is not the user to whom the reply or forwarding message is being sent. In these embodiments, the reply or forwarding message, even though it includes the original message with the voicemail, is treated as a normal electronic message that happens to have an audio file attachment.

Figure 5B:
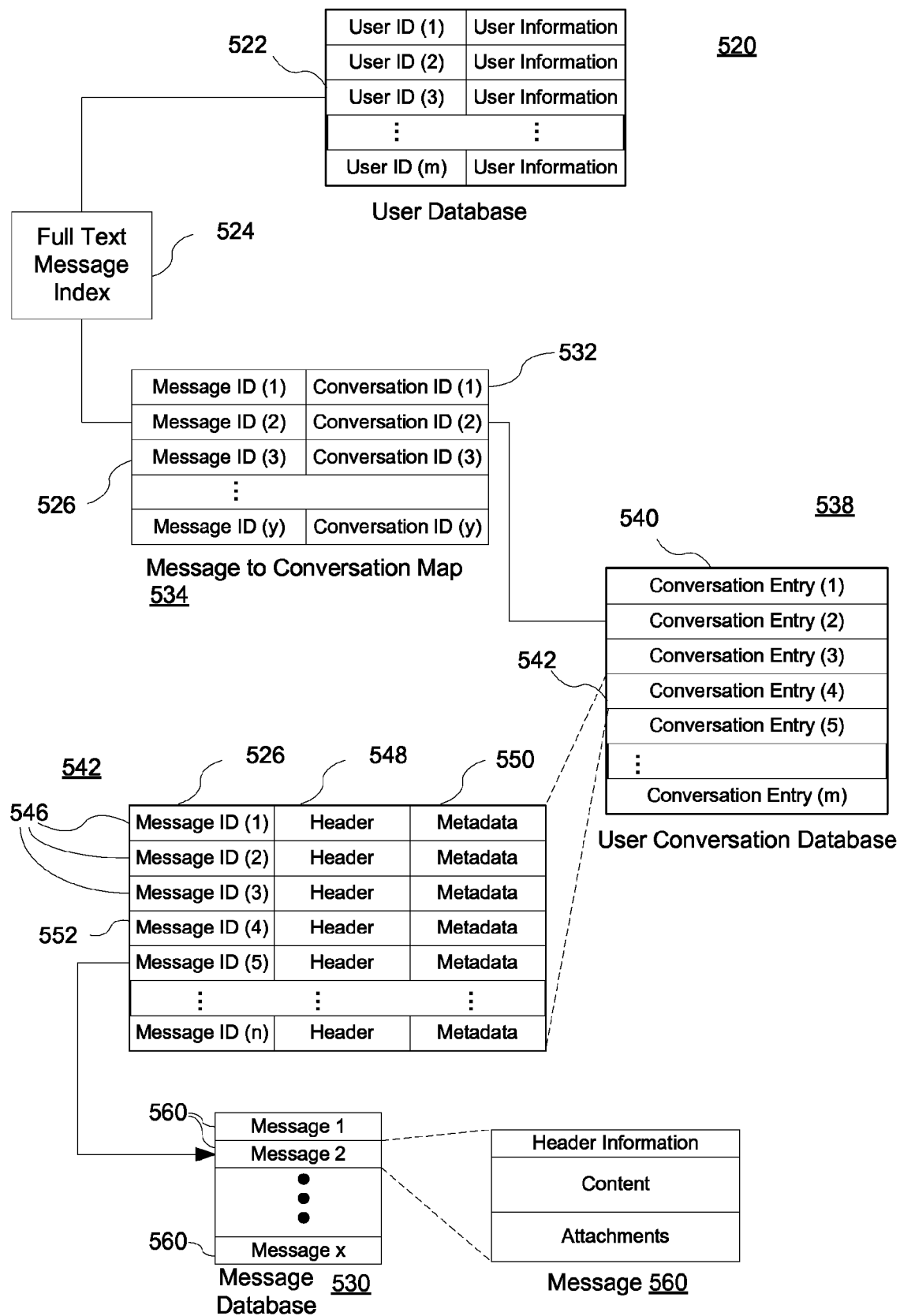
FIG. 5B is a block diagram of an exemplary user database and message database for use in an electronic messaging server.

FIG. 5B illustrates an exemplary user database 520, identifying the users of an electronic messaging system. The user database 520 may contain a User ID 522 that references a full text and attributes index 524 associated with a particular user. The index 524 maps terms and message attributes to messages in a message database 530. A particular Message ID 526 may be associated with a particular Conversation ID 532 in a Message to Conversation Map 534. Each entry in Message to Conversation Map 534 associates (i.e., maps) a Message ID 526 to a Conversation ID 532. In some embodiments, the Conversation ID 532 is an n-bit number. This number uniquely identifies the particular conversation to which the message identified by Message ID 526 belongs. In these embodiments, every conversation in a user's electronic messages account has a distinct Conversation ID.

To identify the other messages associated with a particular conversation, a User Conversation Database 538 may be used. Such a database might be used, for example, when identifying the remainder of the messages included in a conversation where one or more messages had matched a particular search query. The User Conversation Database 538 includes a number of Conversation Entries 540. Each Conversation Entry 540 stores a list of the messages (or other data structure representing the messages) associated with the conversation. All of the messages associated with a respective conversation have the same Conversation ID. The set of messages assigned or associated with a respective Conversation ID may include one or more email messages, one or more chat messages, and one or more electronic voicemail messages, all in the same conversation.

As shown in FIG. 5B, a Conversation Entry 542 may include a linked list of message entries 546, each message entry corresponding to a particular message in the conversation. The linked list might be ordered by, for example, date/time values associated with the messages in the conversation. An exemplary message entry 546 includes the Message ID 526, Header 548, and Metadata 550 of a particular message. The Header 548 may contain all or a portion of a message's header information. The Metadata 550 may contain information identifying certain attributes associated with the message. For example, in some embodiments the Metadata 550 of a message identifies the labels (e.g., labels automatically assigned by the electronic message system and/or user defined labels) or message folders associated with the message. In some embodiments, the Metadata 550 also indicates whether a voicemail tag 502 has been associated with the message. The Message ID(4) 526 of a particular entry 552 may be associated with a particular message in the Message Database 530. In some embodiments, the message entry 546 does not include the content of the body of the corresponding message 560.

In some embodiments, the information in the index 524 and the information in a Conversation Entry 542 may be used to assist in associating a new message (e.g., an email message, an electronic voicemail message or a chat message) with a particular conversation, without accessing the Message database 530. Once a conversation has been associated with a new message, attributes identified in the metadata 550 of the message entries for the identified conversation can be applied to the new message, without having to retrieve any messages from the message database.

Figure 6:
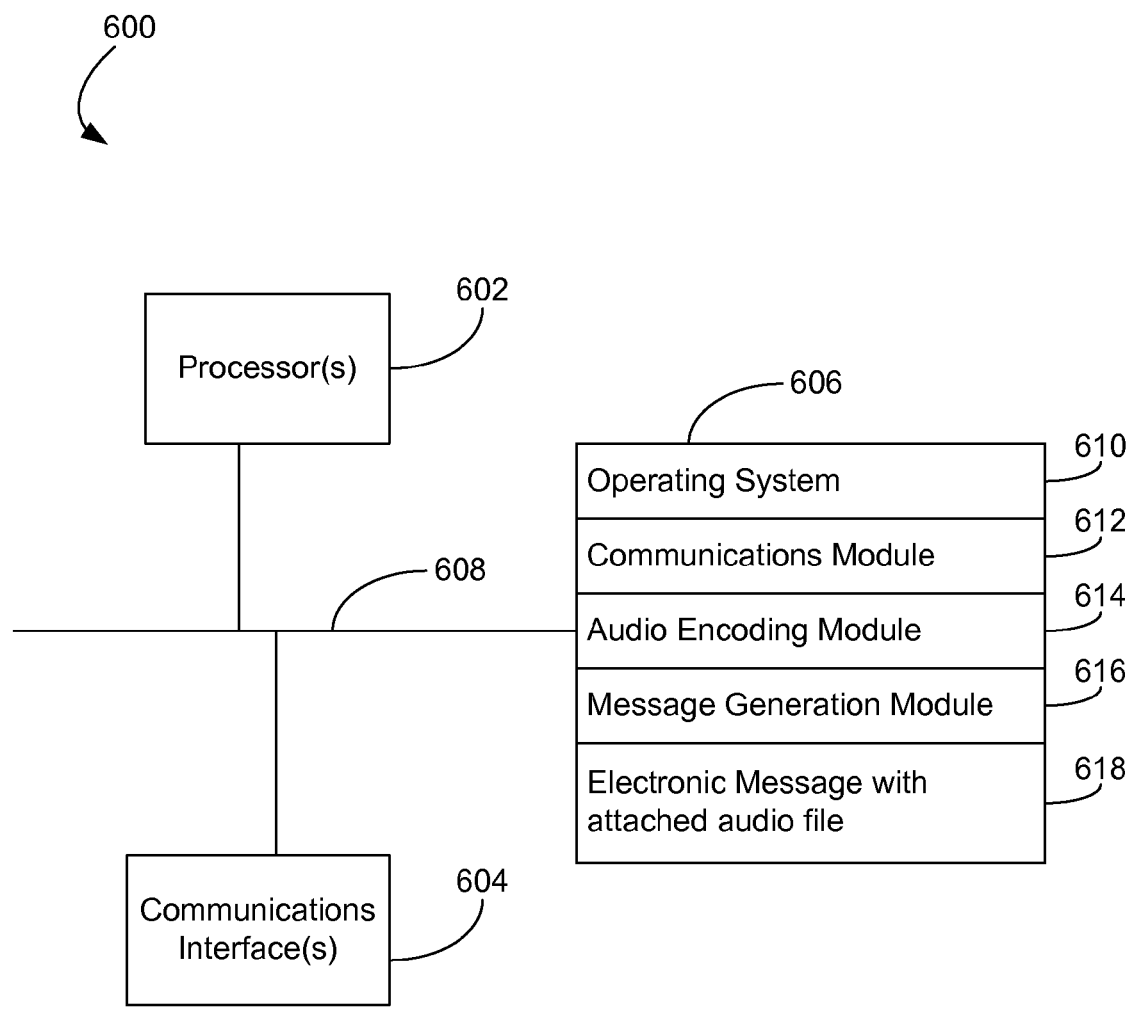
FIG. 6 is a block diagram illustrating a voice communications server in accordance with some embodiments.

Attention is now directed to FIG. 6, which is a block diagram illustrating a voice communications server in accordance with some embodiments. The voice communications server 600 typically includes one or more processing units (CPU's) 602, one or more network or other communications interfaces 604, memory 606, and one or more communication buses 608 for interconnecting these components. The voice communications server 600 optionally may include a user interface (not shown) comprising a display device and a keyboard. Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules and data structures, or a subset thereof:
- an operating system 610 that includes procedures for handling various basic system services and for performing hardware dependent tasks;
- a network communication module 612 that is used for connecting the voice communications server 600 to other computers via the one or more communication network interfaces 604 (wired or wireless) and one or more communication networks, such as the Internet, other wide area networks, local area networks, metropolitan area networks, and so on;
- an audio encoding module 614 for encoding and compressing audio data into digital audio files;
- a message generation module 616 for generating electronic messages with audio file attachments and special tags identifying these messages as messages having associated voicemail audio files; and
- electronic messages with attached audio files 618, generated by the message generation module 616.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 606 may store a subset of the modules and data structures identified above. Furthermore, memory 606 may store additional modules and data structures not described above.

Although FIG. 6 shows a "voice communications server," FIG. 6 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers used to implement a voice communication system, of which the voice communications server 600 is a part, and how features are allocated among them will vary from one implementation to another, and may depend in part on the amount of data traffic that the system must handle during peak usage periods as well as during average usage periods.

Figure 7:
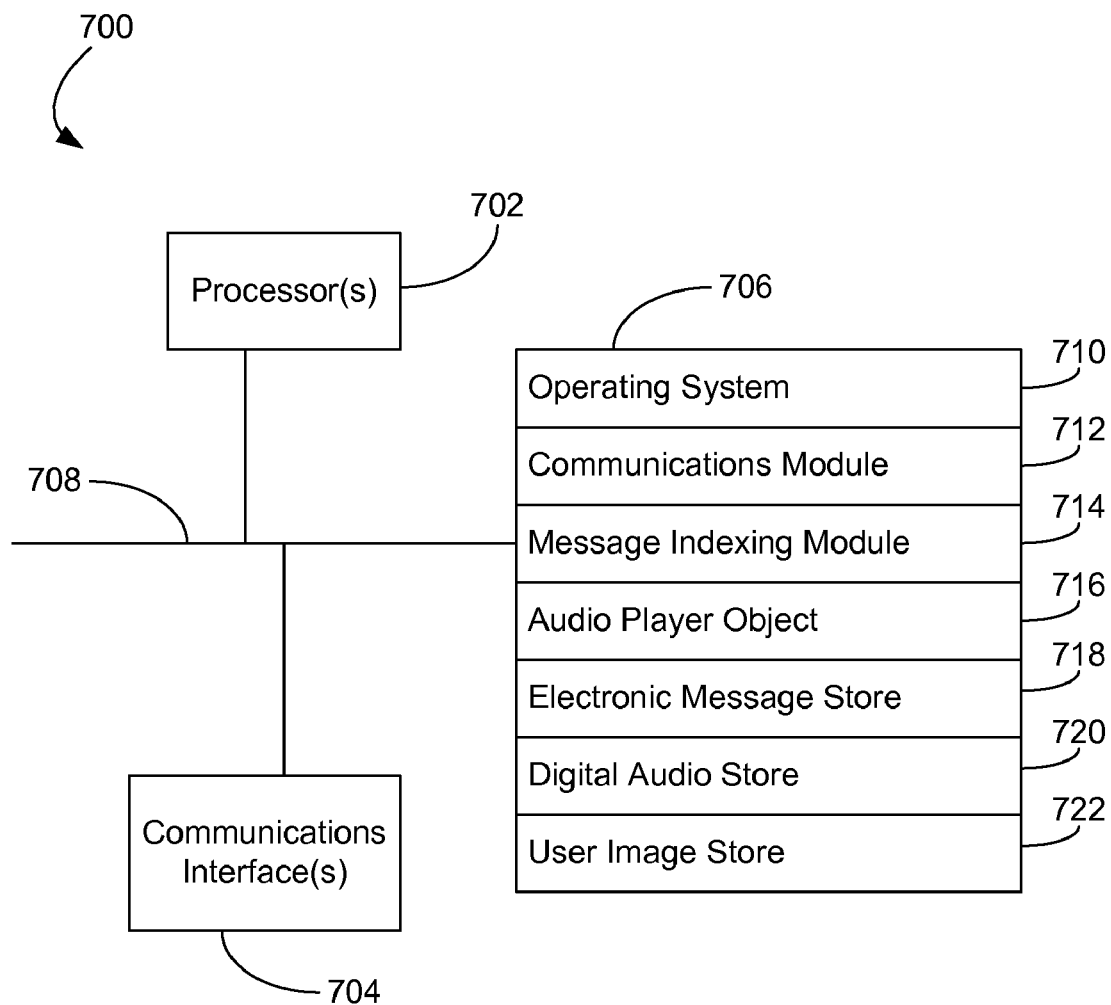
FIG. 7 is a block diagram illustrating an electronic messaging server in accordance with some embodiments.

Attention is now directed to FIG. 7, which is a block diagram illustrating an electronic messaging server in accordance with some embodiments. The electronic messaging server 700 typically includes one or more processing units (CPU's) 702, one or more network or other communications interfaces 704, memory 706, and one or more communication buses 708 for interconnecting these components. The electronic messaging server 700 optionally may include a user interface (not shown) comprising a display device and a keyboard. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. In some embodiments, memory 706 stores the following programs, modules and data structures, or a subset thereof:
- an operating system 710 that includes procedures for handling various basic system services and for performing hardware dependent tasks;
- a network communication module 712 that is used for connecting the electronic messaging server 700 to other computers via the one or more communication network interfaces 704 (wired or wireless) and one or more communication networks, such as the Internet, other wide area networks, local area networks, metropolitan area networks, and so on;
- a message indexing module 714 for indexing electronic messages stored in memory 706;
- an audio player object 716, which is sent along with an electronic message having an associated audio file to a client, thereby facilitating playback of the audio file at the client;
- an electronic message store 718 for storing electronic messages (e.g., the electronic message store 718 may include one or more databases and data structures, such as those discussed above with reference to FIG. 5B);
- an audio file store 720 for storing audio files associated with electronic messages; and
- a user image store 722 for storing images associated with users of the electronic messaging server 700.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 706 may store a subset of the modules and data structures identified above. Furthermore, memory 706 store additional modules and data structures not described above.

Although FIG. 7 shows an "electronic messaging server," FIG. 7 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 7 could be implemented on single servers and single items could be implemented by one or more servers. The actual number of servers used to implement an electronic messaging system, of which the electronic messaging server 700 is a part, and how features are allocated among them will vary from one implementation to another, and may depend in part on the amount of data traffic that the system must handle during peak usage periods as well as during average usage periods.

Figure 8:
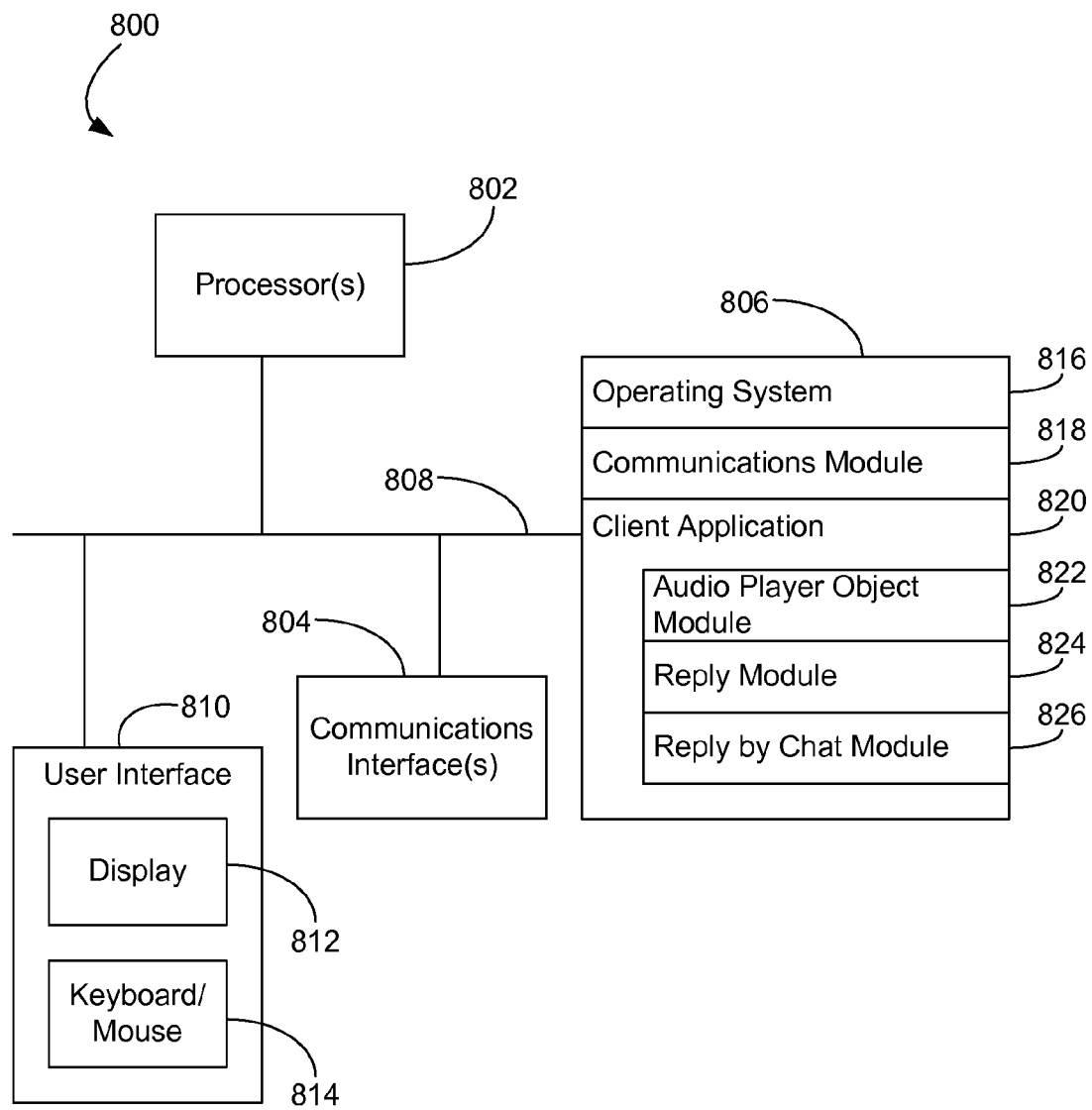
FIG. 8 is a block diagram illustrating a client computer in accordance with some embodiments.

Attention is now directed to FIG. 8, which is a block diagram illustrating a client computer in accordance with some embodiments. The client computer 800 typically includes one or more processing units (CPU's) 802, one or more network or other communications interfaces 804, memory 806, and one or more communication buses 808 for interconnecting these components. The client computer 800 also includes a user interface 810, which may include a display device 812 and a keyboard and mouse 814. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 806 may optionally include one or more storage devices remotely located from the CPU(s) 802. In some embodiments, memory 806 stores the following programs, modules and data structures, or a subset thereof:

- an operating system 816 that includes procedures for handling various basic system services and for performing hardware dependent tasks;
- a network communication module 818 that is used for connecting the voice communications server 800 to other computers via the one or more communication network interfaces 804 (wired or wireless) and one or more communication networks, such as the Internet, other wide area networks, local area networks, metropolitan area networks, and so on; and
- a client application 820 for rendering and displaying content.

In some embodiments, the client application is a web browser. The client application 820 is a web browser application, or other browser application, and includes an audio player object module 822 for playing back digital audio files, a reply module 824 for replying to messages by electronic messaging, and a reply by chat module 826 for replying to messages by chat. In some embodiments, the audio player object module 822, reply module 824, and reply by chat module 826 are downloaded to the client from a server, such as the electronic messaging server 700. In some embodiments, the audio player object module 822 is an Adobe Flash object, which invokes a flash player that is built-in the client application (e.g., the flash player may be an extension of a web browser). In some embodiments, the modules 822, 824, 826 are implemented using JavaScript. For example, in some embodiments, the modules 822, 824, 826 are JavaScript modules or instructions embedded in one or more web pages downloaded from a server to the client 800.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 806 may store a subset of the modules and data structures identified above. Furthermore, memory 806 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method, comprising:
at a client system having one or more processors, memory storing one or more programs for execution by the one or more processors, and a display device:
receiving an electronic message, wherein the electronic message is an email message and is associated with audio data;
displaying a plurality of regions including a first contiguous region, wherein, when the audio data contains a voicemail message, the displaying includes simultaneously displaying, within the first contiguous region:
the electronic message;
an email reply object comprising a reply box for entry of an email reply message replying to the electronic message;
an audio player object configured for playing back the audio data; and
a chat reply object:
detecting selection of the chat reply object; and
in response to detecting selection of the chat reply object:
initiating a chat session associated with the electronic message; and
displaying a second contiguous region distinct from the plurality of regions, wherein the second contiguous region includes a chat window that at least partially covers the reply box.

2. The method of claim 1, wherein the audio data comprises a digital audio file.

3. The method of claim 1, wherein the audio data comprises an MP3 file.

4. The method of claim 1, wherein the audio player object is a Flash object.

5. The method of claim 1, further comprising simultaneously displaying, while displaying the electronic message, the audio player object and the chat reply object, an image associated with a sender of the electronic message.

6. A graphical user interface, comprising:
a plurality of regions, wherein a first contiguous region of the plurality of regions is associated with an electronic message and the electronic message is an email message and is associated with audio data, and the first contiguous region includes a plurality of simultaneously displayed GUI objects, including, when the audio data contains a voicemail message:
a message information region for displaying information associated with the electronic message;

an email reply object comprising a reply box for entry of an email reply message replying to the electronic message;

an audio player object, displayed within the first contiguous region and configured for playing back the audio data; and a chat reply object displayed within the first contiguous region, wherein:
in response to selection of the chat reply object:
a chat session associated with the electronic message is initiated; and
a second contiguous region distinct from the plurality of regions is displayed, wherein the second contiguous region includes a chat window that at least partially covers the reply box.

7. The graphical user interface of claim 6, wherein an image associated with a sender of the message is simultaneously displayed while displaying the electronic message, the audio player object and the chat reply object.

8. A system, comprising:
memory;
one or more processors; and
one or more programs, wherein the one or more programs are stored in the memory and configured for execution by the one or more processors, the one or more programs comprising:
instructions to receive an electronic message, wherein the electronic message is an email message and is associated with audio data; and
instructions to display a plurality of regions including a first contiguous region, wherein, when the audio data contains a voicemail message, the instructions to display cause the system to simultaneously display, within the first contiguous region:
the electronic message;
an email reply object comprising a reply box for entry of an email reply message replying to the electronic message;
an audio player object configured for playing back the audio data; and
a chat reply object;
instructions to detect selection of the chat reply object; and
instructions to, in response to detecting selection of the chat reply object:
initiate a chat session associated with the electronic message; and
display a second contiguous region distinct from the plurality of regions, wherein the second contiguous region includes a chat window that at least partially covers the reply box.

9. The system of claim 8, wherein the audio data comprises a digital audio file.

10. The system of claim 8, wherein the audio data comprises an MP3 file.

11. The system of claim 8, wherein the audio player object is a Flash object.

12. The system of claim 8, wherein the one or more programs further comprise instructions to simultaneously display, while displaying the electronic message, the audio player object and the chat reply object, an image associated with a sender of the electronic message.

13. A non-transitory computer readable storage medium storing one or more programs, the one or more programs comprising instructions, which when executed by a computer system, cause the computer system to:

receive an electronic message, wherein the electronic message is an email message and is associated with audio data; and display a plurality of regions including a first contiguous region, wherein, when the audio data contains a voicemail message, and the instructions to display cause the computer system to simultaneously display, within the first contiguous region:
the electronic message;
an email reply object comprising a reply box for entry of an email reply message replying to the electronic message;
an audio player object configured for playing back the audio data; and
a chat reply object;
detect selection of the chat reply object; and
in response to detecting selection of the chat reply object:
initiate a chat session associated with the electronic message; and
display a second contiguous region distinct from the plurality of regions, wherein the second contiguous region includes a chat window that at least partially covers the reply box.

14. The computer readable storage medium of claim 13, wherein the audio data comprises a digital audio file.

15. The computer readable storage medium of claim 13, wherein the audio data comprises an MP3 file.

16. The computer readable storage medium of claim 13, wherein the audio player object is a Flash object.

17. The computer readable storage medium of claim 13, further comprising instructions to simultaneously display, while displaying the electronic message, the audio player object and the chat reply object, an image associated with a sender of the electronic message.

18. A system, comprising:
one or more processors;
memory storing one or more programs for execution by the one or more processors;
means for receiving an electronic message, wherein the electronic message is an email message and is associated with audio data;
means for displaying a plurality of regions including a first contiguous region, wherein, when the audio data contains a voicemail message, the means for displaying cause the system to simultaneously display, within the first contiguous region:
the electronic message;
an email reply object comprising a reply box for entry of an email reply message replying to the electronic message;
an audio player object configured for playing back the audio data; and
a chat reply object;
means for detecting selection of the chat reply object; and
means, responsive to detecting selection of the chat reply object, for:
initiating a chat session associated with the electronic message; and
displaying a second contiguous region distinct from the plurality of regions, wherein the second contiguous region includes a chat window that at least partially covers the reply box.

19. The method of claim 1, further comprising simultaneously displaying, while displaying the electronic message, the audio player object and the chat reply object, presence information associated with a sender of the electronic message.

20. The graphical user interface of claim 6, including a presence information region to display presence information associated with a sender of the electronic message.

21. The system claim 8, wherein the one or more programs futher comprise instructions to simultaneously display, while displaying the electronic message, the audio player object and the chat reply object, presence information associated with a sender of the electronic message.

22. The computer readable storage medium of claim 13, futher comprising instructions to simultaneously display, while displaying the electronic message, the audio player object and the chat reply object, presence information associated with a sender of the electronic message.

23. The method of claim 1, further comprising, prior to displaying the plurality of regions, determining whether the electronic message is associated with a predefined voicemail tag that identifies electronic messages with which it is associated as having audio data that contains a voicemail message.

24. The method of claim 1, further comprising, displaying the audio player object configured for playing back the audio data only when the electronic message is associated with a voicemail tag identifying the electronic message as having audio data that contains a voicemail message.

25. The method of claim 1, wherein the electronic message is indexed so that it is searchable as a voicemail message only when the electronic message is associated with a voicemail tag identifying the electronic message as having audio data that contains a voicemail message.

26. The method of claim 1, further comprising, when the electronic message is associated with a voicemail tag identifying the electronic message as having audio data that contains a voicemail message:
   displaying the audio player object in the first contiguous region; and
   forwarding a copy of the electronic message, including the audio data, to another client system, wherein the voicemail tag is not included in the copy of the electronic message.

27. The system of claim 8, wherein the one or more programs further comprise instructions to determine, prior to displaying the plurality of regions, whether the electronic message is associated with a predefined voicemail tag that identifies electronic messages with which it is associated as having audio data that contains a voicemail message.

28. The system of claim 8, wherein the one or more programs further comprise instructions to display the audio player object configured for playing back the audio data only when the electronic message is associated with a voicemail tag identifying the electronic message as having audio data that contains a voicemail message.

29. The system of claim 8, wherein the electronic message is indexed so that it is searchable as a voicemail message only when the electronic message is associated with a voicemail tag identifying the electronic message as having audio data that contains a voicemail message.

30. The system of claim 8, wherein the one or more programs further comprise instructions to, when the electronic message is associated with a voicemail tag identifying the electronic message as having audio data that contains a voicemail message:
   display the audio player object in the first contiguous region; and
   forward a copy of the electronic message, including the audio data, to another client system, wherein the voicemail tag is not included in the copy of the electronic message.

31. The computer readable storage medium of claim 13, further comprising instructions to determine, prior to displaying the plurality of regions, whether the electronic message is associated with a predefined voicemail tag that identifies electronic messages with which it is associated as having audio data that contains a voicemail message.

32. The computer readable storage medium of claim 13, further comprising instructions to display the audio player object configured for playing back the audio data only when the electronic message is associated with a voicemail tag identifying the electronic message as having audio data that contains a voicemail message.

33. The computer readable storage medium of claim 13, wherein the electronic message is indexed so that it is searchable as a voicemail message only when the electronic message is associated with a voicemail tag identifying the electronic message as having audio data that contains a voicemail message.

34. The computer readable storage medium of claim 13, further comprising instructions to, when the electronic message is associated with a voicemail tag identifying the electronic message as having audio data that contains a voicemail message:
   display the audio player object in the first contiguous region; and
   forward a copy of the electronic message, including the audio data, to another client system, wherein the voicemail tag is not included in the copy of the electronic message.

* * * * *